Oct. 25, 1955     F. C. ARMISTEAD     2,721,943
RADIATION DETECTIONS
Filed Oct. 21, 1950
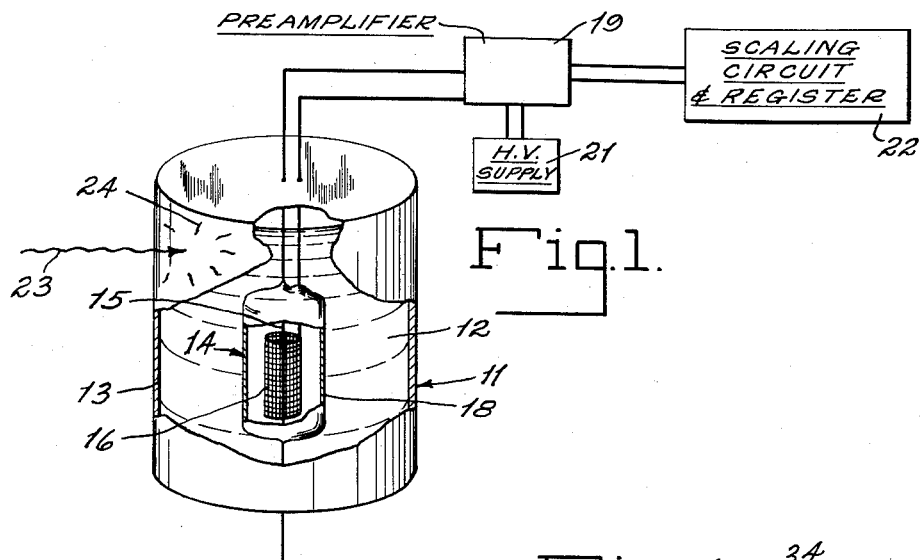
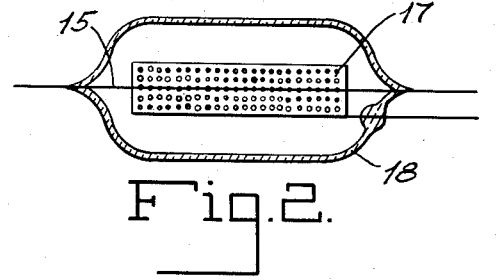
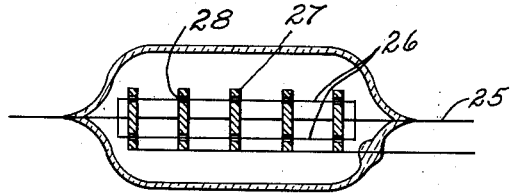
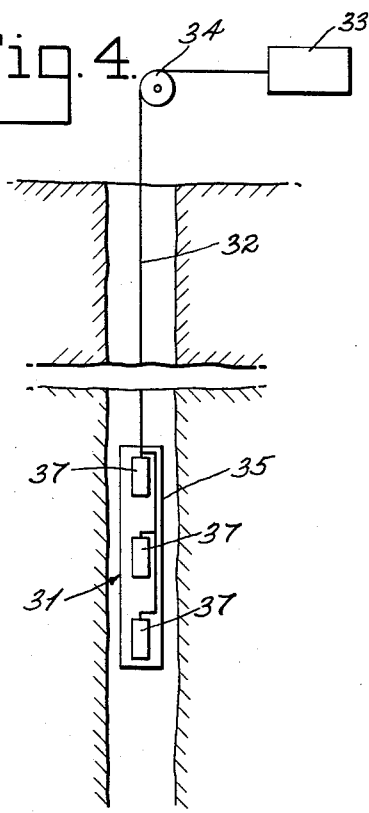
INVENTOR.
FONTAINE C. ARMISTEAD
BY
ATTORNEYS

United States Patent Office 2,721,943
Patented Oct. 25, 1955

2,721,943

RADIATION DETECTIONS

Fontaine C. Armistead, Marblehead, Mass., assignor to Texaco Development Corporation, New York, N. Y., a corporation of Delaware Application October 21, 1950, Serial No. 191,339

4 Claims. (Cl. 250—71)

This invention relates to the detection and measurement of penetrative radiation such as gamma rays, and more particularly to applications thereof to radioactive surveying of the surface of the earth and formations therebeneath such as are encountered in prospecting and in the drilling of wells for oil, gas, water and the like.

The detection and measurement of penetrative radiation such as gamma rays with a considerable degree of accuracy has been a difficult problem. Probably, the most commonly used devices to date are counters or detectors of Geiger-Mueller type. Such counters include a cathode usually of hollow cylindrical shape which is positioned about a wire serving as an anode, the intervening and surrounding space being occupied by a suitable gas, the whole being enclosed by a vessel of glass or of some other suitable solid. The vessel along with the electrodes and gaseous filling contained within it can be considered as a detector head with which a gamma ray may interact to produce a usable effect. An interaction with this type of head will cause one or more free electrons to appear within the gas filled space between the cathode and anode. The appearance of the electron(s) will in turn cause a well-known "Townsend avalanche" thus giving rise to a usable physical effect which for this kind of a head is the collection of a very considerable number of electrons by the anode, i. e., a current pulse. This kind of a detector head has a relatively low effective density since a large part of it consists merely of the volume of gas which is essential to its operation. Because of this, the probability that an interaction will occur each and every time a gamma ray passes through the head is very low, whereby an efficiency of 0.5% for this type of detector head is considered good.

A counter which operates on a different principle, the so-called scintillation counter, employs a quantity of solid material as a detector head. This solid material is a luminophor, also called a phospor, which interacts with the gamma photon and luminesces or gives off scintillations. Such a luminophor must be transparent or translucent to its own luminescent light, i. e., the scintillations discharged therefrom. The luminesence event or scintillation is the required usable physical effect and the quality of transparency or translucency is necessary to permit the light of the scintillation to escape from the interior of the luminophor for physical observation. A marked advantage of the scintillation detector over the Geiger-Mueller detector is that the scintillation detector head is a solid of relatively greater density as contrasted to the less dense head of the Geiger-Mueller counter. Therefore, in the scintillation counter, there is a much greater probability of the gamma radiation interacting and producing the desired physical results. This feature is considered to be responsible for the scintillation detector having from 10 to 100 times the detecting efficiency of the Geiger-Mueller counter.

As is well known, the physical effect, i. e., the electrical discharge in the gas space in the Geiger-Mueller counter is easily utilized since it can directly actuate an electrical circuit. On the other hand, the physical effect produced in the scintillation counter, i. e., the scintillations, is not so easily utilized. Usually the arrangement is such that the light of the scintillations falls on the cathode of a multiplier phototube which converts the light into an electrical pulse and then amplifies the pulse. Tubes commonly used for this purpose include RCA types 931–A, 1P21, 1P28 and 5819. Such tubes have the disadvantages that they are limited to solid angles of light collection appreciably less than 4 steradians and therefore collect only a small proportion of the light of scintillation, and the cathode material used has such a low work function that thermionic emission at room temperature causes a very troublesome "thermal background." Considerable amplification is required which in practice involves the use of a linear amplifier and discriminator for eliminating the smaller thermal background pulse.

In such scintillation counters employing luminophors such as naphthalene, anthracene, zinc sulfide, zinc silicate, and scheelite, the uses have been limited by certain natural limitations inherent in the luminophors. For example, it is necessary that the size of each luminophor be kept below a certain critical dimension. This dimension is usually considered to be the maximum dimension at which the radiation generated or developed in the luminophor can escape therefrom and above which the luminophor will absorb such radiation so that the amount of radiation or scintillations discharged from the luminophor corresponds to only that generated within the critical dimension as measured from the radiating surface. A further limitation is found in the fact that such luminophors as napthalene, anthracene, and scheelite are not in convenient physical forms for handling or shaping as desired. The crystals or so-called "slabs" of such compounds that are used are exceedingly delicate and fragile and are generally unsuited for standing the wear and tear incident to use on a day-to-day basis. Even under good storage conditions, such crystals tend to fragmentate, striate and become opaque with a corresponding loss in efficiency.

In overcoming the aforesaid disadvantages of the prior art, it is an object of this invention to provide a novel radiation detection assembly and method of greater efficiency and greater adaptability to differing situations.

Another object of the invention is the provision of a novel radiation detector assembly wherein an improved and more efficient relationship is established between a luminophor and the means for determining the scintillations therefrom.

Still another object of the invention is the provision of novel methods and apparatus for the surveying of earth surface or formations beneath the surface of the earth.

Further objects and advantages of the invention will appear from the following description and claims taken in connection with the attached drawings wherein:

Fig. 1 illustrates in diagrammatic form an embodiment of the invention wherein a detector of the Geiger-Mueller type employing a cathode of wire mesh is used.

Fig. 2 is a section through the axis of a modified detector wherein a cathode of perforate metal is used.

Fig. 3 is a section through the axis of a detector having a cathode formed as a series of separate plates.

Fig. 4 is a diagrammatic showing of the invention as employed in the logging of a well bore.

In its broader aspect, the present invention can be said to involve a detection of penetrative radiation such as gamma radiation by the use of a liquid luminophor sensitive to such gamma radiation with the emission of scintillations and combined with a detector capable of determining the intensity of the scintillations and accordingly determining the intensity of the original radiation.

More specifically, the invention involves the use of a detector of the Geiger-Mueller type which is more selectively sensitive to such scintillations than the multiplier phototube and adaptable to more efficient operation with liquid luminophors.

The invention further contemplates the use of such a radiation detecting assembly in the radioactive surveying of the earth's surface and formations therebeneath.

In some respects, the invention can be said to be in the nature of an improvement over that disclosed in the copending application of C. F. Teichmann, Serial No. 138,341, filed January 13, 1950, and entitled "Detection and Measurement of Radiation."

Referring to Fig. 1 of the drawings, a detector assembly generally indicated at 11 is formed of a liquid luminophor 12 contained within a vessel 13 having walls capable of being penetrated by the radiation it is desired to measure and a light detector 14 which is a light-sensitive type of Geiger-Mueller tube and which, as shown in Fig. 1, is entirely or substantially immersed in the liquid luminophor.

The liquid luminophor can be formed of a number of compounds including a solution of p-diphenylbenzene (terphenyl) in m-xylene, 0.5 g./100 cc. Other solutions that can be used include napthalene in benzene (40 g./100 cc.), napthalene (35 g.) and anthracene (0.35 g.) in benzene (90 cc.), terphenyl (2 g.) in benzene (100 cc.) and liquid dibenzyl at 60° C. Since the exact composition of the liquid luminophor forms no part of the present invention, a detailed list of the various compositions that might be used is considered unnecessary. However, it is desirable that the liquid luminophor be of a character such that scintillations developed therein will not be absorbed prior to reaching detector 14.

Detector 14 includes a central anode 15 surrounded by a cathode 16 of generally hollow cylindrical shape and formed either as a cylinder of wire mesh as shown in Fig. 1 or as a perforate cylinder 17 as shown in Fig. 2, suitable materials therefor including calcium, barium, aluminum, molybdenum, magnesium, wolfram, zinc, copper, nickel, silver, carbon, potassium and sodium. In the case of sodium, it is contemplated that a film of sodium be deposited or otherwise formed on the inner face of the glass envelope to make the cathode, contact being made therewith by a cylindrical band formed of spring metal which expands out against the inner surface of the sodium-coated glass envelope. The use of a combination of caesium and antimony is contemplated where a glass envelope is filled with argon of high purity at about 10 cm. pressure. If desired, the cathode may be formed of one metal such as a 50 mesh copper screen and sodium or some other suitable metal deposited thereon. With a hydrogen filling, carefully cleaned copper cathodes have been found to produce a light-sensitive counter.

A housing 18 is provided about the cathode, the housing being formed of a material which permits the entry of scintillations from the surrounding liquid luminophor 12. A suitable material for the housing is Corning 9741 glass which has been found to permit the pasage of over 80% of light photons of 2,600 angstrom units. Obviously, the detectors must be sensitive in the spectral range of the scintillations from the luminophor.

Leads from anode 15 and cathode 16 of detector 14 are taken to a pre-amplifier 19 connected to a high voltage supply 21 and a scaling circuit and register 22. Since these elements are conventional in character and well-known in the art, detailed description thereof is considered unnecessary.

In operation, if it be assumed that a gamma photon 23 be directed against luminophor 12, the gamma photon will interact with the relatively dense detecting head afforded by the use of a liquid luminophor causing the latter to produce a scintillation of light photons as shown at 24. Such scintillations as are directed toward the detector 14 will be registered thereby in a positive manner and finally recorded on the register.

With this arrangement, a very high efficiency of detection for the penetrative radiation is obtained by reason of the relative dense character of the liquid luminophor. The resultant interaction which produces scintillations produces a marked and positive physical effect in detector 14 which is easily susceptible to observation and count. Each physical effect produced in the detector decays in a very short period of time so that the detector is quickly ready for the next physical effect.

While a detector of the Geiger-Mueller type is shown in Fig. 1, it is to be understood that a multiplier phototube may be used therein since it is capable of registering a certain number of the scintillations developed in the liquid luminophor. However, a detector of the Geiger-Mueller type is preferred because it is able to receive and record scintillations from a solid angle of 4 steradians as contrasted to the relatively small solid angle of a multiplier phototube. Moreover, a multiplier phototube calls for more complicated circuitry and the cathode material used therein has such a low work function that thermionic emission at room temperature causes a very troublesome "thermal background." Thus, considerable amplification is required which in practice involves the use of a linear amplifier and discriminator for eliminating the smaller thermal background pulses.

Another suitable detector or photosensitive tube capable of use in lieu of detector 14 is the proportional counter tube described by Curran, Cockroft and Angus, Phil. Mag. 40, 929 (1949). Another suitable detector or photosensitive tube capable of use in lieu of detector 14 is the Geiger-Mueller tube specially treated as described by M. V. Scherb, Phys. Rev. 73, 86 (1948).

Fig. 2 illustrates a detector of generally the same type as shown in 14 at Fig. 1 except that the cathode therein is in the form of a perforate metal cylinder.

Fig. 3 likewise shows a Geiger-Mueller type of detector which can be used in the assembly of Fig. 1, the anode 25 therein being formed of a series of wires 26 extending in directions substantially parallel to the axis of the detector. A cathode 27 is formed of a series of transverse metal plates, each plate having a series of holes 28 therein which are aligned so that anode wires 26 extend therethrough. Such an arrangement is disclosed in greater detail in United States Patent No. 2,397,071 of March 19, 1946 to D. G. C. Hare.

Fig. 4 illustrates an application of the invention to the logging of a well bore wherein a gamma ray detector is passed through the bore and the output thereof recorded as a log or curve showing the intensities of radiation entering the bore hole from the surrounding formations. The detector assembly includes a housing 31 of generally elongate shape supported from the surface by a cable 32 which also carries the necessary power connections to the detector assembly and the signals from the detector assembly to the surface where they may be suitably amplified and recorded at 33 by methods already known in the art. Since such type of apparatus is well-known in the art, detailed description thereof is considered unnecessary.

Cable 32 is arranged to pass over a measuring wheel 34 in conventional manner so that the position of detector housing 31 in the bore hole can be determined at any time and that position synchronized or related to the signals received from the detector assembly. The detector proper includes a housing 35, the walls of which are made of a material such that gamma radiation or any other desired radiation may pass therethrough, the interior of the housing being occupied by one or more masses of liquid luminophor 37 of the type shown in Fig. 1.

In operation, the radiation received from the formation immediately adjacent detector assembly 31 develops scintillations within the liquid luminophors which are observed by the one or more detectors 37. The signals therefrom are then transmitted to the surface, recorded and used as desired.

From the foregoing, it is believed evident that the present invention provides novel methods and apparatus whereby more accurate determinations of penetrative radiation such as gamma radiation can be made. A liquid luminophor of the type shown has more capacity for generating scintillations from a given gamma flux and transmitting this light to a detector as compared with the prior solid luminophors which are limited in size, difficult to prepare, and are fragile and difficult to handle in day-to-day use.

In addition to the application to well logging as shown in Fig. 4, the detector assembly herein shown is also adaptable to surface surveying, either on the surface or above the surface of the earth. In such case, the liquid luminophor will be contained in a detector having walls capable of being penetrated by the radiation it is desired to measure and combined with a detector in the manner shown in Fig. 1. The detector assembly can then be moved over the surface of the earth on foot or by vehicle or it can be carried above the surface of the earth by an aircraft such as a helicopter. The variations in radiation intensity thus obtained can be utilized to determine the presence of mineral deposits in the earth either by reason of the high radioactivity of such mineral deposits or the development of positive and negative anomalies such as disclosed in the co-pending application of Gerhard Herzog, Serial No. 13,842, filed March 9, 1948 and entitled "Prospecting."

It is intended throughout that whenever the term "Geiger-Mueller type detector" is used, it shall be understood to include also such detector tubes operated in the "proportional" region.

Obviously many modifications and variations of the invention, as hereinbefore set forth, may be made without departing from the spirit and scope thereof and, therefore, only such limitations should be imposed as are indicated in the appended claims.

I claim:

1. Apparatus for determining penetrative radiation such as gamma rays comprising a mass of translucent liquid luminophor responsive to such radiation with the resultant emission of scintillations, and a gas filled photoelectric detector of the type adapted to afford gas amplification through the occurrences of Townsend avalanches, said device being adjacent to said luminophor and sensitive to said scintillations whereby the radiation incident on said liquid luminophor is finally determined by said detector.

2. Apparatus for determining penetrative radiation such as gamma rays comprising a mass of translucent liquid luminophor responsive to such radiation with the resultant emission of scintillations, and a photo-electric detector in direct physical contact with the luminophor and sensitive to said scintillations whereby the radiation incident on said liquid luminophor is finally determined by said detector.

3. Apparatus for determining penetrative radiation such as gamma rays comprising a mass of translucent liquid luminophor responsive to such radiation with the resultant emission of scintillations, and a detector sensitive to said scintillations and having a photo-sensitive element facing outwardly over a large solid angle and in substantially all directions in an arc of nearly 360° which subtends said solid angle, said detector being immersed in said liquid mass whereby the radiation incident on said liquid mass is determined by said detector.

4. Apparatus for logging an earth bore and comprising a cylindrical receptacle containing a mass of liquid luminophor and arranged to traverse said bore to receive on its outside for transfer to the luminophor contained within it penetrative radiation moving in any substantially inward direction from the side wall of the bore, said mass being responsive to radiation with the emission of scintillations, and a detector substantially immersed in said liquid mass near the axis of the cylindrical receptacle, the detector having a photo-sensitive element facing outwardly toward the inside surface of the cylindrical wall of the enclosure in substantially all directions radially outward from said axis and being of a type to determine scintillations from said liquid mass whereby radiation incident on said liquid mass is finally determined by said detector.

References Cited in the file of this patent

UNITED STATES PATENTS

| | | |
|---|---|---|
| 2,351,028 | Fearon | June 13, 1944 |
| 2,445,305 | Hochgesang | July 13, 1948 |
| 2,469,460 | Fearon | May 10, 1949 |
| 2,694,152 | Teichmann | Nov. 9, 1954 |

OTHER REFERENCES

Fluorescence of Solutions Bombarded . . . etc.—Kallmann et al., Physical Review, vol. 79, #5, September 1, 1950, pp. 857–870—Scintillation Digest.

Electronic Fire and Flame Detector—Weisz, Electronics, July 1946, pp. 106–109.

Luminescence of Liquids and Solids—Pringsheim et al., Interscience Publishers, Inc., 1943, New York, pp. 68, 69, 172–176.

Nucleonics, March 1948, pages 58 and 59.